United States Patent [19]

Toya

[11] Patent Number: 4,786,109
[45] Date of Patent: Nov. 22, 1988

[54] ARRANGEMENT FOR PROTECTING SEAT OPERATION LEVER AGAINST SEAT BELT IN VEHICLE SEAT

[75] Inventor: Shinichi Toya, Akishima, Japan

[73] Assignee: Tachi-S Co., Ltd., Akishima, Japan

[21] Appl. No.: 162,674

[22] Filed: Mar. 1, 1988

[51] Int. Cl.⁴ ............................................. A47B 95/02
[52] U.S. Cl. ................... 297/355; 16/110 R; 16/112; 297/284; 297/483
[58] Field of Search ............... 297/355, 483, 468, 482, 297/284; 16/DIG. 12, DIG. 19, 110 R, 112, 123

[56] References Cited

U.S. PATENT DOCUMENTS

| 4,248,479 | 2/1981 | Toda | 297/355 X |
| 4,456,219 | 6/1984 | Scott | 16/112 X |
| 4,493,494 | 1/1985 | Feagin, Jr. | 16/DIG. 12 |
| 4,522,445 | 6/1985 | Goldner | 297/284 |
| 4,615,085 | 10/1986 | Hartman | 16/112 X |

Primary Examiner—James T. McCall
Attorney, Agent, or Firm—Browdy and Neimark

[57] ABSTRACT

An arrangement for protecting a seat operation lever against its being entangled with or caught by a seat belt in a vehicle seat. A protector is provided on the lateral side of the seat such that it is disposed above the forward end of the operation lever or around the base portion of the operation lever. In this arrangement, the protector serves to avoid the possibility of the operation lever being entangled with or caught by the seat belt.

10 Claims, 2 Drawing Sheets

ARRANGEMENT FOR PROTECTING SEAT OPERATION LEVER AGAINST SEAT BELT IN VEHICLE SEAT

BACKGROUND OF THE INVENTION

1. Field of the Invention

The present invention relates to a vehicle seat, and particularly to an arrangement provided on the vehicle seat, wherein an operation lever (a lever for actuating a lumbar support device or reclining device, for instance) disposed on the lateral side of the seat is protected against its being entangled with or caught by a seat belt so that the lever can be operated without interference of the seat belt.

2. Description of the Prior Art

Generally, most of automotive seats are so designed that the lumbar support portion can be adjusted by means of a lumbar support device or the seat back be angularly adjusted by a reclining device to satisfy the seating posture preferences of an occupant sitting thereon.

In many cases, an operation lever is provided on the lateral side of the seat, so as to actuate the lumbar support device and reclining device. As shown in FIGS. 1 and 2 of the accompanying drawings, there are two operation levers (2) arranged on the respective lateral wall portions of a seat cushion (3) and seat back (4). Further, a seat belt (5) is extended laterally of a seat (1) for ready use such that the body of occupant on the seat may be restrained from his or her shoulder to waist.

This seat structure is, however, with such problem that, the operation levers (2), when moved, are entangled or interfered with the seat belt (5) which is located adjacent to the levers (2), as a result of which there arises an annoying incovenience on the occupant part to operate the levers (2).

SUMMARY OF THE INVENTION

With the above problem in view, it is therefore a primary purpose of the present invention to provide an arrangement wherein a seat operation lever, such as lever for a lumbar support device and reclining device, which is provided on the lateral side of the seat, is protected against entanglement or interference with a seat belt extending adjacent to the lever.

In accomplishing such purpose, according to the present invention, there is fixedly mounted a protector in the proximity of a seat operation lever provided on the lateral side of a seat in a manner permitting the lever to be operated without contact with the protector.

It is another purpose of the present invention to provide a protector which is designed to be free from entanglement with or being caught by the seat belt.

For such purpose, the present invention comprises a protector of which construction is such that its body extends in a direction away from the seat operation lever, with its forward end portion being progressively narrower in width and lower in height. Due to such form of protector, the seat belt is not entagled with the protector and thus the protector is prevented from being caught by the seat belt.

It is still another purpose of the present invention to provide an arrangement in which the seat operation lever is freely operated without obstruction of the protector per se.

For such purpose, in accordance with the present invention, there are a pair of the protectors arranged such that the one of them is disposed above the forward end of the seat operation lever and the other is disposed below the base portion of the same, thereby providing an opened state on both sides of the lever to make accessible the lever without obstruction of the protectors, so that an occupant on the seat reaches the lever in a direction laterally thereof and rotates it for seat adjustment operation.

DETAILED DESCRIPTION OF PREFERRED EMBODIMENTS OF THE INVENTION

Figure 1:
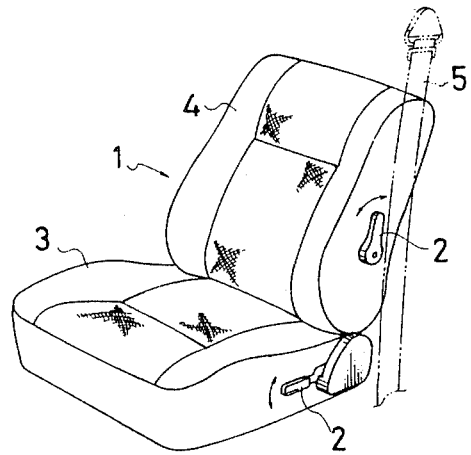
FIG. 1 is a perspective view of a conventional common automotive seat.
Figure 2:
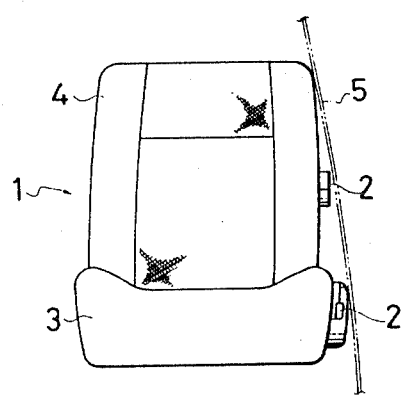
FIG. 2 is a plan view of the same in the FIG. 1.
Figure 3:
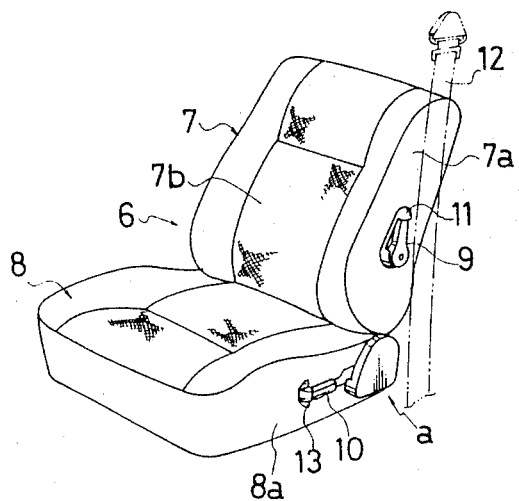
FIG. 3 is a perspective view of an automotive seat equipped with protectors in accordance with the present invention.

Referring to FIG. 3, there is illustrated an automotive seat (1) provided with an arrangement in accordance with the present invention, which is for preventing entanglement or interference with a seat belt from seat operation levers, the details of which will be described below.

The seat (6) comprises a seat back (7) and a seat cushion (8). Above the lateral wall (7a) of the seat back (7), extended is a seat belt (12).

Further, on the lateral wall (7a) of the seat back (7), there is provided an operation lever (9) which is adapted to actuate a lumbar support device (not shown) for adjustments of the lumbar support portion of the seat back (7) to match a desired lumbar position of an occupant sitting on the seat.

On the other hand, there is mounted a reclining device (a) on the lateral wall (8a) of the seat cushion (8) for angularly adjustments of the seat back (7) relative to the seat cushion (8). The reclining device (a) has an operation lever (10) which is disposed at the side of the lateral wall (8a) of the seat cushion (8).

As shown, in the vicinity of the operation levers (9)(10), arranged are respectively protectors (11)(13) which will be explained specficially hereinafter.

Figure 4:
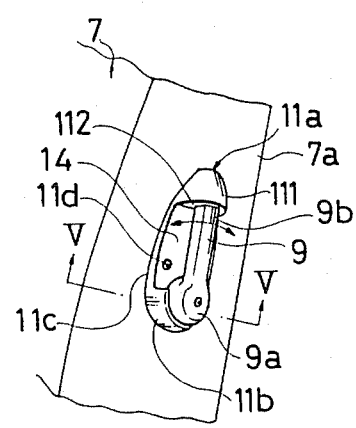
FIG. 4 is a partially enlarged perspective view of the seat in the FIG. 3, showing the state where the protector of the present invention is provided around an operation lever for lumbar support device.
Figure 5:
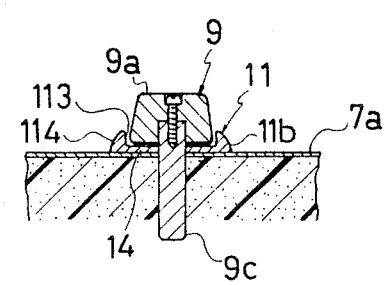
FIG. 5 is a sectional view taken along the line V—V of the FIG. 4.
Figure 6:
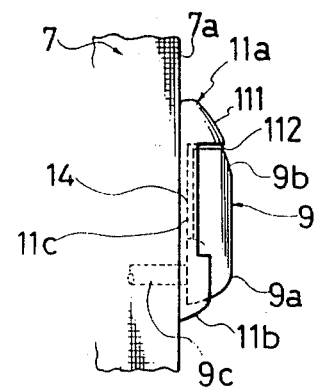
FIG. 6 is a partially enlarged plan view of the seat in the FIG. 3, showing the state where the protector of the present invention is provided around the operation lever for lumbar support device.

Now, referring to FIGS. 4, 5 and 6, illustrative is the first protector (11) provided in the vicinity of the lumbar support device operation lever (9).

This lever (9) has a base portion (9a) formed in its lower portion. A torque rod (9c) is integrally fixed to the base portion (9a) and operatively connected with the lumbar support device situated within the seat back (7) (See FIG. 5). Hence, as shown in FIG. 4, the forward end portion of the lever (9) is rotatable with respect to the base portion (9a) in the arrow direction, the base portion (9a), thus, forming a center of rotation of the lever (9). Although not shown in the drawings, it is therefore noted that the rotation of the lever (9) causes the torque rod (9c) to rotate simultaneously so as to produce the forward and rearward movement of the lumbar support plate of the lumbar support device for adjustably raising or lowering the lumbar support portion (7b) of seat back (7), whereby the occupant on the seat can adjust the lumbar support force at a preferred degree against his or her lumbar part.

The first protector (11) comprises an upper protector member (11a), a plate member (14) and a lower protector member (11b), all of those member being formed integrally together in the illustrated manner. More specifically, the upper and lower protector members (11a)(11b) are integrally formed with the upper and lower end portions of the plate member (14), respectively, in an opposed relationship with each other. The plate member (14) is fixed on the lateral wall (7a) of the seat back (7) by means of a small screw (11d), and further is of a substantially ellipse shaped configuration greater in length than the entire length of the lever (9). Upon such plate member (14), is mounted the base portion (9a) of the lever (9), with the torque rod (9c) extending downwardly through a hole (not shown) perforated in the plate member (14) towards the lumber support device.

As best shown in FIGS. 4 and 6, the intermediate portion of the plate member (14) defined between the upper and lower protector members (11a)(11b) is fomred at its both peripheral lateral ends formed with a projected portion (11c). In particular, as in FIG. 4, the projected portions (11c) extends upwardly from the plate member 914) to such a degree that the operation lever (9), when rotated extremely clockwise or counterclockwise, contacts one of the projected portions (11c), whereupon the lever (9) is limited its rotation. In other words, the two projected portions (11c) serve as a limit against the rotation of the lever (9), and thus, the lever (9) is rotated within the range between the projected portions (11c).

The aforementioned upper protector member (11a) is disposed above the forward end (9b) of the operation lever (9) and has an inner wall (112) formed generally vertically relative to the plate member (14) in a facing relationship with the forward end (9b) of the lever (9). Further, the inner wall (112) is formed arcuate in its width-wise direction in a manner conforming to an arcuate track along which the forward end (9b) passes with rotation of the lever (9), such that a small clearance is provided between the inner wall (112) and the forward end (9b), and that such clearance is retained uniformly therebetween even when the lever (9) is rotated.

In addition, the outer surface (111) of the upper protector member (11a) is so formed that it becomes progressively narrower in width and lower in height as it proceeds in a direction departing from the forward end (9b) of the lever (9), thereby representing what can be termed as a half-bullet-like shape. The provision of such upper protector member (11a) above the lever (9) prevents the forward end (9b) of the lever (9) from being entangled with or being caught by the seat belt (12). Also, the upper protector member (11a) per se, by the reason of its being shaped in a half-bullet-like form, has a smooth and slippery surface, and as such, the contact of the seat belt (12) upon that surface of the upper protector member (11a) results in the passing by of the seat belt (12) over the protector member (11a) and therefore, there is no possibility of the upper protector member (11a) being entangled with or caught by the seat belt (12).

The lower protector member (11b) is formed such that it circumscribes approximately half of the circumferential surface of the base portion (9a) of the operation lever (9) with a small clearance provided between the lower protector member (11a) and the base portion (9a), and that its inner wall (113) stands vertical relative to the plate member (14) whereas its outer wall (114) slopes down thereto. This form of the lower protector member (11b) provides a smooth and slippery surface over the base portion (9a) so that the seat belt (12), when contacts the base portion (9a), passes by thereover. Thus, there is no possibility of both base portion (9a) and lower protector member (11b) being entangled with or caught by the seat belt (12).

Figure 8:
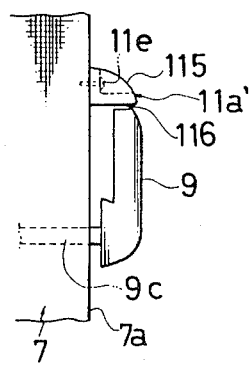
FIG. 8 is a plan view of the seat as in the FIG. 7.
Figure 7:
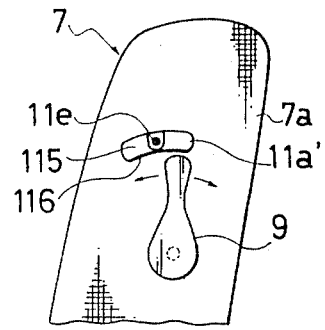
FIG. 7 is a partially enlarged side view of a seat back of the seat as in the FIG. 3, showing another embodiment of protector in accordance with the present invention.

Referring to FIGS. 7 and 8, there is illustrated another embodiment of the present invention, in which only one protector (11a') is arranged above the same lumber operation lever (9) as stated above. In this particular embodiment, the protector (11a') is formed in an arcuate shape corresponding to an arcuate track along which the formed end (9a) of the lever (9) passes with the rotation of the lever (9) per se, and is further disposed above the forward end (9a) with a small clearance provided between the protector (11a') and the forward end (9a). As best shown in FIG. 8, the inner wall (116) of the protector (11a') stands vertically relative to the lateral wall (7a) of the seat back (7) and the outer wall (115) thereof slopes down thereto. With this structure, for the same reasons discussed above, the lever (9) is protected by the protector (11a') against being entangled with or caught by the seat belt (12), and also, the protector (11a') is prevented from such entanglement with the seat belt (12). Numeral (11e) designates a small screw by means of which the the protector (11a') is fixed to the lateral wall (7a) of the seat back (7).

Figure 9:
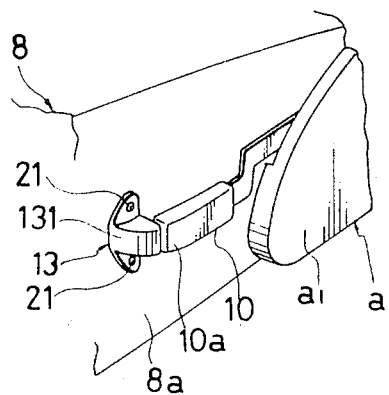
FIG. 9 is a partially enlarged perspective view of the seat as in the FIG. 3, showing the state where the protector is provided at an operation lever for reclining device.
Figure 10:
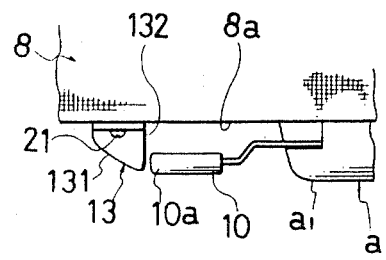
FIG. 10 is a plan view of the seat as in the FIG. 9.

Referring to FIGS. 9 and 10, illustrated is the second protector (13) arranged above the forward end (10a) of the reclining device operation lever (10). Specifically, the second protector (13) comprises an outer wall (131) and inner wall (132) such that the outer wall (131) slopes down to its lower end whereas the inner wall (132) stands vertically relative to the lateral wall of (8a) of the seat cushion (8), and the protector (13) per se is fixed by means of two small screws (21) to the lateral wall (8a) of the seat cushion (8). It is noted here that the base portion of the reclining device operation lever (10) is covered with a housing (a1) of the reclining device (a). Accordingly, the protector (13) and housing (a1) cooperates to protect the lever (10) against being entangled with or caught by the seat belt (12).

For all the above-described protectors (11)(11a') (13), their respective heights are level with or sightly lower than those of the operation levers (9) (10).

Preferably, each of the protectors (11)(11a') (13) is made of a synthetic resin material.

While the description above are made in regard to the protecting arrangement for the lumbar support operation lever and reclining device operation lever, the arrangements are not limited to such embodiments but may apply to other kinds of operation levers located laterally of the seat back and seat cushion which have possibility of being entangled with or caught by seat belt.

From the above descriptions, it is to be appreciated that the provision of the protectors on the respective lateral walls of the seat back and seat cushion prevents the operation levers located on those lateral walls against their being entangled with or caught by the seat belt, thereby making easily accessible the levers without interference of the seat belt so that an occupant on the seat can reach and operate the levers without any annoying difficulty.

It should be understood that the present invention is not limited to the illustrated embodiments, but other replacements, modifications and additions may structurally be possible without departing from the spirit of the appended claims for the invention.

What is claimed is:

1. An arrangement for protecting a seat operation lever against a seat belt in a vehicle seat, in which an operation lever is provided on a lateral side of said seat and a seat belt is extended over said lateral side as well as adjacently to said operation lever, said arrangement comprising:
a protector provided on said lateral side of said seat in such a manner that it is disposed in the vicinity of said operation lever as well as at a point allowing said operation lever to be moved,
whereby, said operation lever is protected against its being entangled with or caught by said seat belt.

2. The arrangement as defined in claim 1, wherein said protector is provided at a lateral wall of said seat such that it is disposed above a forward end portion of said operation lever.

3. The arrangement as defined in claim 1, wherein said protector is provided at a lateral wall of said seat such that it is disposed around a base portion of said operation lever.

4. The arrangement as defined in claim 1, wherein said operation lever is adapted for actuating a lumbar support device provided within said seat back.

5. The arrangement as defined in claim 1, wherein said operation lever is adapted for actuating a reclining device provided on said seat.

6. The arrangement as defined in claim 1, wherein said operation lever is so formed that its forward end portion is rotated on a lateral wall of said seat with respect to its base portion which forms a center of rotation of said operation lever.

7. The arrangement as defined in claim 1, wherein said protector comprises an inner wall and outer wall, said inner wall being disposed in a facing relation with a forward end portion of said operation lever and said outer wall being so formed that it slopes down in a direction departing from said operation lever.

8. The arrangement as defined in claim 1, wherein said protector is so formed that it becomes progressively narrower in width and lower in height as it proceeds in a direction departing from said operation lever.

9. The arrangement as defined in claim 1, wherein an inner wall of said protector which faces said operation lever is formed arcuate and wherein there is provide a clearance between said inner wall and said operation lever, whereby while said operation lever is being rotated, said clearance is retained uniformly between said inner wall and said operation lever.

10. The arrangement as defined in claim 1, wherein said protector includes a plate member formed integrally therewith and wherein said operation lever is mounted on said plate member.

* * * * *